US011505169B2

(12) United States Patent
Friedrich et al.

(10) Patent No.: US 11,505,169 B2
(45) Date of Patent: Nov. 22, 2022

(54) MULTIPLE-CIRCUIT HYDRAULICALLY OPEN BRAKING SYSTEM, IN PARTICULAR FOR A HIGHLY AUTOMATED OR AUTONOMOUS VEHICLE

(71) Applicant: Robert Bosch GmbH, Stuttgart (DE)

(72) Inventors: Thomas Friedrich, Ingersheim (DE); Dirk Drotleff, Oberstenfeld-Gronau (DE); Ralf Kleemann, Benningen Am Neckar (DE); Daniel Brenndoerfer, Ludwigsburg (DE); Bernd Hienz, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 16/975,369

(22) PCT Filed: Jan. 7, 2019

(86) PCT No.: PCT/EP2019/050241
§ 371 (c)(1),
(2) Date: Aug. 24, 2020

(87) PCT Pub. No.: WO2019/161982
PCT Pub. Date: Aug. 29, 2019

(65) Prior Publication Data
US 2020/0406878 A1 Dec. 31, 2020

(30) Foreign Application Priority Data
Feb. 26, 2018 (DE) ...................... 10 2018 202 885.0

(51) Int. Cl.
*B60T 13/58* (2006.01)
*B60T 7/12* (2006.01)
(Continued)

(52) U.S. Cl.
CPC ................ *B60T 13/58* (2013.01); *B60T 7/12* (2013.01); *B60T 8/17* (2013.01); *B60T 13/20* (2013.01);
(Continued)

(58) Field of Classification Search
CPC ... B60T 13/58; B60T 7/12; B60T 8/17; B60T 13/20; B60T 13/662; B60T 13/686; B60T 15/028
See application file for complete search history.

(56) References Cited

U.S. PATENT DOCUMENTS 9,914,440 B2 * 3/2018 Bauer ................... B60T 8/4081
11,148,651 B2 * 10/2021 Hienz ...................... B60T 8/17
(Continued)

FOREIGN PATENT DOCUMENTS

| CN | 1549781 A | 11/2004 |
|---|---|---|
| CN | 101028816 A | 9/2007 |

(Continued)

OTHER PUBLICATIONS

International Search Report corresponding to PCT Application No. PCT/EP2019/050241, dated Apr. 9, 2019 (German and English language document) (5 pages).

*Primary Examiner* — Pamela Rodriguez
(74) *Attorney, Agent, or Firm* — Maginot, Moore & Beck LLP

(57) ABSTRACT

A multiple-circuit hydraulically open braking system, for a highly automated or autonomous vehicle, includes at least two wheel brakes each assigned to a braking circuit having a pressure relief path, two multiple-circuit pressure generators hydraulically connected in series between a fluid container and the at least two wheel brakes, and a hydraulic unit for hydraulically connecting the pressure generator to the at least two wheel brakes and for individual brake pressure (Continued)

modulation in the at least two wheel brakes. A first pressure generator is configured as a plunger system and is assigned to a main system having a first energy supply and a first evaluation and control unit. A second pressure generator is configured as a second plunger system or as a pump system and is assigned to a secondary system having a second energy supply that is independent from the first energy supply and a second evaluation and control unit.

20 Claims, 6 Drawing Sheets

(51) Int. Cl.
  *B60T 8/17* (2006.01)
  *B60T 13/20* (2006.01)
  *B60T 13/66* (2006.01)
  *B60T 13/68* (2006.01)
  *B60T 15/02* (2006.01)

(52) U.S. Cl.
  CPC .......... *B60T 13/662* (2013.01); *B60T 13/686* (2013.01); *B60T 15/028* (2013.01); *B60T 2270/402* (2013.01)

(56) References Cited

U.S. PATENT DOCUMENTS

| | | | |
|---|---|---|---|
| 2013/0292999 A1* | 11/2013 | Strengert | B60T 8/268 303/10 |
| 2014/0152085 A1* | 6/2014 | Biller | B60T 8/441 303/10 |
| 2014/0203626 A1* | 7/2014 | Biller | B60T 8/17 303/10 |
| 2016/0214582 A1* | 7/2016 | Brenn | B60T 7/042 |
| 2017/0001612 A1* | 1/2017 | Bauer | B60T 8/4081 |
| 2017/0072920 A1* | 3/2017 | Besier | B60T 8/4081 |
| 2017/0282877 A1* | 10/2017 | Besier | B60T 13/142 |

FOREIGN PATENT DOCUMENTS

| | | |
|---|---|---|
| CN | 101372230 A | 2/2009 |
| CN | 107000718 A | 8/2017 |
| DE | 10 2009 001 135 A1 | 8/2010 |
| DE | 10 2010 042 990 A1 | 5/2012 |
| DE | 10 2013 227 066 A1 | 6/2015 |
| DE | 10 2015 206 572 A1 | 11/2015 |
| DE | 10 2014 225 958 A1 | 6/2016 |
| DE | 10 2016 201 261 A1 | 7/2016 |

* cited by examiner

MULTIPLE-CIRCUIT HYDRAULICALLY OPEN BRAKING SYSTEM, IN PARTICULAR FOR A HIGHLY AUTOMATED OR AUTONOMOUS VEHICLE

This application is a 35 U.S.C. § 371 National Stage Application of PCT/EP2019/050241, filed on Jan. 7, 2019, which claims the benefit of priority to Serial No. DE 10 2018 202 885.0, filed on Feb. 26, 2018 in Germany, the disclosures of which are incorporated herein by reference in their entirety.

The disclosure proceeds from a multi-circuit hydraulically open brake system, in particular for a highly automated or autonomous vehicle. The subject matter of the present disclosure is also an operating method for a multi-circuit hydraulically open brake system of this type.

BACKGROUND

Vehicles with at least one highly automated or autonomous driving function are known from the prior art, which vehicles can at least partially assume an actual driving task. As a result, the vehicles can drive in a highly automated or autonomous manner, by the vehicles, for example, automatically detecting the road course, other road users or obstacles, calculating the corresponding actuating commands in the vehicle, and forwarding them to the actuators in the vehicle, as a result of which the driving course of the vehicle is influenced correctly. In the case of a highly automated or autonomous vehicle of this type, the driver is as a rule not involved in the driving process. Nevertheless, measures and means are provided which make it possible for the driver to be able to intervene himself/herself in the driving process at any time.

In addition, brake systems for vehicles are known from the prior art, which brake systems are designed for an actuation by way of a vehicle driver by way of a hydraulic intervention. As a result, it is ensured in the case of failure of the brake system that the driver can still apply sufficient brake force to the wheels of the vehicle by way of actuation of the brake pedal. This design significantly influences the topology of current brake systems. Thus, for example, the size of a tandem brake master cylinder can be based on maintaining satisfactory performance on the fallback level. In addition, the brake systems can be configured as what are known as coupled brake systems or power brake systems. Said systems are also realized, however, in such a way that there is still a hydraulic intervention by way of the driver as fallback level. Power brake systems are unsuitable for highly automated or autonomous vehicles, since a driver is no longer present there for boosting purposes during an autonomous driving function and the brake system has to build up the brake energy in a completely independent manner.

DE 10 2009 001 135 A1 has disclosed a method for the actuation of a hydraulic vehicle brake system. The vehicle brake system comprises an electromechanical brake booster and a traction control system. Here, the vehicle brake system is actuated by way of the brake booster in situations in the case of which a brake pedal is not actuated, for example in order to limit a vehicle speed or for distance control with respect to a preceding vehicle or in the case of parking.

SUMMARY

The multi-circuit hydraulically open brake system, in particular for a highly automated or autonomous vehicle, and the corresponding operating method for a multi-circuit hydraulically open brake system of this type have the advantage that a simple, robust and inexpensive brake system architecture is provided without mechanical and/or hydraulic intervention via the driver, which brake system architecture makes sufficient brake performance possible by way of a suitable redundancy concept even in the case of a fault.

Embodiments of the disclosure have fewer components than known brake systems, since fewer valves, no pedal travel simulator, and no mechanism for generating, boosting and forwarding the driver pressure are required, with the result that lower brake system costs are produced. This additionally results in lower system costs, since there is only one hydraulic connector at the wheel brakes and no alternative solutions with two connectors in the brake caliper which act on different pistons are required. Furthermore, the fluid vessel has only one hydraulic connector per brake circuit and alternative solutions with a plurality of connectors are superfluous.

Moreover, this results in lower integration costs for the vehicle manufacturer, since the embodiments of the disclosure make a simple installation, in particular for right-hand drive and left-hand drive vehicles, possible on account of the electric actuation without mechanical and/or hydraulic intervention via the driver, and free up installation space on the bulkhead between the engine compartment and the vehicle interior compartment. Since none of the brake system actuators have to be mounted on the bulkhead, this can also result in NVH (Noise, Vibration, Harshness) advantages. In addition, the smaller number of components results in a lower weight and volume in comparison with known brake systems.

A modular concept with two modules can be implemented simply by way of the division into a main system and a secondary system.

Embodiments of the present disclosure provide a multi-circuit hydraulically open brake system, in particular for a highly automated or autonomous vehicle, with at least two wheel brakes which are assigned to in each case one brake circuit with a pressure discharge path, two multi-circuit pressure generators which are connected hydraulically in series between a fluid vessel and the at least two wheel brakes, and a hydraulic unit for the hydraulic connection of the pressure generators to the at least two wheel brakes and for the individual brake pressure modulation in the at least two wheel brakes. Here, a first pressure generator is configured as a plunger system and is assigned to a main system which comprises a first energy supply and a first evaluation and control unit. A second pressure generator is configured as a second plunger system or as a pump system and is assigned to a secondary system which comprises a second energy supply, which is independent of the first energy supply, and a second evaluation and control unit which actuates the second pressure generator. In addition, components of the hydraulic unit are assigned to the main system for individual brake pressure modulation, with the result that said components of the hydraulic unit and the first pressure generator are actuated by the first evaluation and control unit and are supplied with energy by the first energy supply.

In addition, an operating method for a multi-circuit hydraulically open brake system of this type, in particular for a highly automated or autonomous vehicle, is proposed. In normal operation, the main system increases or reduces or holds the pressure in the brake circuits by means of the first pressure generator, and carries out the individual brake pressure modulation in the at least two wheel brakes by means of the hydraulic unit. The secondary system, in the case of failure of the main system, increases or reduces or holds the pressure in the brake circuits by means of the second pressure generator, and the individual brake pressure modulation in the at least two wheel brakes is dispensed with.

A hydraulically open brake system is understood to mean a brake system in the case of which brake fluid from the wheel brakes which is discharged during an individual brake pressure modulation can be fed back to the fluid vessel via a pressure discharge path. In the case of embodiments of the present disclosure, the brake system is open in normal operation. In the case of failure of the main system, the brake system is closed, with the result that individual brake pressure modulation of the wheel brakes is not possible.

Various regulating functions, such as for example an anti-lock brake control system ABS, a traction control system ASR, a driving dynamics control system FDR or ESP, for longitudinal and transverse stabilization of the vehicle can be implemented in an advantageous way by way of the individual brake pressure modulation in the individual wheel brakes. Since said regulating functions are known per se, they will not be described in greater detail here.

The embodiment of the first pressure generator as a plunger system results in satisfactory NVH performance in the entire system and simpler and/or more precise monitoring and improved regulation. This makes it possible that both positional and volumetric and pressure build-up information can be detected in the main system more simply and, in particular, more accurately in comparison with other concepts (pump system).

The embodiment of the second pressure generator as a plunger system results in highly satisfactory NVH performance both in normal operation and in the case of failure of the main system.

The embodiment of the second pressure generator as a pump system results in even lower costs, installation space and weight in comparison with other concepts (plunger system).

In the present case, the evaluation and control unit can be understood to mean an electric unit, such as for example a control unit, which processes and/or evaluates detected sensor signals. The evaluation and control unit can have at least one interface which can be configured as hardware and/or software. In the case of a configuration as hardware, the interfaces can be, for example, part of what is known as a system ASIC which comprises a very wide variety of functions of the evaluation and control unit. It is also possible, however, that the interfaces are dedicated, integrated circuits or consist at least partially of discrete components. In the case of a configuration as software, the interfaces can be software modules which are present, for example, on a microcontroller in addition to other software modules. A computer program product with program code is also advantageous, which is stored on a machine-readable carrier such as a semiconductor memory, a hard disk memory or an optical memory and is used to carry out the evaluation when the program is executed by the evaluation and control unit.

Sensor units are provided for the detection of the sensor signals, which sensor units are understood in the present case to mean modules which comprise at least one sensor element which detects a physical variable and/or a change in a physical variable directly or indirectly and preferably converts it into an electric sensor signal. This can take place, for example, via the outputting and/or the receiving of acoustic waves and/or electromagnetic waves and/or via a magnetic field or the change in a magnetic field and/or the receiving of satellite signals, for example, of a GPS signal. A sensor unit of this type can comprise, for example, acceleration sensor elements which detect acceleration-relevant information of the vehicle, and/or sensor elements which determine objects and/or obstacles and/or other crash-relevant vehicle environment data and provide them for evaluation. Sensor elements of this type can be based, for example, on video technologies and/or radar technologies and/or LIDAR technologies and/or PMD technologies and/or ultrasonic technologies. In addition, signals and information of an existing ABS sensor system and the variables which are derived in the control unit which is provided for this purpose can also be evaluated. In a manner which is based on the acceleration-relevant information and/or variables which are determined therefrom, for example, a vehicle movement and a vehicle position can be estimated in three-dimensional space and can be evaluated for accident detection.

For determining the position of the vehicle, for example, GNSS (Global Navigation Satellite System) systems can be used. Here, GNSS is used as a collective term for the use of existing and future global satellite systems such as NAVSTAR GPS (Global Positioning System) of the United States of America, GLONASS (Global Navigation Satellite System) of the Russian Federation, Galileo of the European Union, BeiDou of the People's Republic of China, etc.

A highly automated or autonomous vehicle is understood to mean a vehicle which has at least one highly automated or autonomous driving function which can assume an actual driving task at least partially. Via said at least one highly automated or autonomous driving function, the vehicle detects, for example, the road course, other road users or obstacles automatically, and calculates the corresponding actuating commands which are forwarded to the actuators in the vehicle, as a result of which the driving course of the vehicle is influenced correctly. In the case of a highly automated or autonomous vehicle of this type, the driver is as a rule not involved in the driving process. Nevertheless, measures and means, for example in the form of electric or electronic actuating elements, are provided which make it possible for the driver to be able to intervene himself/herself in the driving process at any time. The braking request which is generated by the driver by means of the actuating elements is then forwarded via electric signals to the main system and/or the secondary system. There is, however, no mechanical and/or hydraulic intervention by way of the driver.

In order to plan the trajectory, the at least one driving function evaluates vehicle data which are detected by internal sensor units such as ABS interventions, steering angle, position, direction, speed, acceleration, etc. and/or vehicle environmental data which are detected, for example, via camera units, radar units, LIDAR units and/or ultrasonic sensor units, and actuates the evaluation and control units of the main system and of the secondary system accordingly, in order to generate a desired braking pressure and/or to realize stabilization operations in the longitudinal and/or transverse direction by way of individual brake pressure modulation in the wheel brakes.

Advantageous improvements of the multi-circuit hydraulically open brake system, in particular for a highly automated or autonomous vehicle, and of the operating method for a multi-circuit hydraulically open brake system of this type, in particular for a highly automated or autonomous vehicle, are possible by way of the measures and developments disclosed herein.

It is particularly advantageous that the sequence of the pressure generators which are connected fluidically in series can be adapted to the installation conditions without negative effects on the functionality. Thus, for example, first of all the first pressure generator and then the second pressure generator can be arranged downstream of the fluid vessel. As an alternative, first of all the second pressure generator and then the first pressure generator can be arranged downstream of the fluid vessel.

In one advantageous refinement of the brake system, a hydraulic bypass can be configured in the brake circuits in each case parallel to the first pressure generator and/or to the second pressure generator. Here, in each case one first switching valve can shut off or release the hydraulic bypass in a first brake circuit around the first pressure generator and/or around the second pressure generator, and in each case one second switching valve can shut off or release the hydraulic bypass in a second brake circuit around the first pressure generator and/or around the second pressure generator. As a result, the throttling action by way of the pressure generators can be prevented in an advantageous way.

In a further advantageous refinement of the brake system, the fluid vessel can comprise a first fluid chamber for the fluid supply of the first brake circuit and a second fluid chamber for the fluid supply of the second brake circuit. In addition, the first plunger system and the second plunger system can have in each case a piston/cylinder unit with two pistons and two chambers and with a drive. Here, the respective drive can move in each case the two pistons of the corresponding plunger system counter to the force of corresponding restoring springs for setting the pressure in the chambers. Here, in each case one first chamber can be assigned to the first brake circuit and in each case one second chamber can be assigned to the second brake circuit, it being possible for flow to pass through the piston/cylinder units of the plunger systems in the currentless state. Thus, brake fluid can flow in a substantially unimpeded manner through the piston/cylinder units. Furthermore, the pump system can have a first pump which is assigned to the first brake circuit, a second pump which is assigned to the second brake circuit, and a common drive which drive the two pumps. As a result, in the case of embodiments of the disclosure, a continuous dual circuit nature from the fluid vessel as far as the wheel brakes can be implemented in an advantageous way, with the result that the requirements of the leakage monitoring system can be lowered.

In a further advantageous refinement of the brake system, for each wheel brake, the hydraulic unit can comprise in each case one inlet valve and in each case one outlet valve for the individual brake pressure modulation. In addition, the hydraulic unit can have in each case one shut-off valve for the first plunger system in each brake circuit, which shut-off valve makes replenishing of brake fluid from the fluid vessel possible. On account of the open architecture, the first plunger system is capable of replenishing or recharging fluid. Here, the shut-off valves advantageously prevent the plunger system from sucking in brake fluid from the wheel brakes during the replenishing operation. Furthermore, the hydraulic unit can have in each case one suction line with a check valve for the first plunger system in each brake circuit, which suction line can additionally connect the first plunger system hydraulically to the fluid vessel. As a result, the replenishing operation can be carried out more rapidly, in particular at low temperatures.

In a further advantageous refinement of the brake system, the hydraulic unit for the pump system can comprise, in each brake circuit, in each case one pressure holding and pressure regulating valve, which pressure holding and pressure regulating valves are assigned to the secondary system and can be actuated by the second evaluation and control unit and can be supplied with energy by the second energy supply. The inlet valves and the pressure holding and pressure regulating valves can be configured, for example, as controllable normally open solenoid valves. The outlet valves and the shut-off valves can be configured, for example, as electromagnetic normally closed switching valves. By way of said embodiment of the hydraulic unit, it is possible in an advantageous way for ESP systems which are already known to be used and for very low overall system costs to be achieved via an already existing economy of scale (ESP has been installed millions of times). Furthermore, a first wheel brake and a second wheel brake can be assigned to the first brake circuit, and a third wheel brake and a fourth wheel brake can be assigned to the second brake circuit. Here, both an X-split, that is to say the wheel brake of the left-hand front wheel and the wheel brake of the right-hand rear wheel are assigned to the first brake circuit, and the wheel brake of the right-hand front wheel and the wheel brake of the left-hand rear wheel are assigned to the second brake circuit, and an II-split, that is to say the wheel brake of the left-hand front wheel and the wheel brake of the left-hand rear wheel are assigned to the first brake circuit, and the wheel brake of the right-hand front wheel and the wheel brake of the right-hand rear wheel are assigned to the second brake circuit, of the brake circuits are possible.

In addition, the hydraulic unit for the pump system, in particular in the case of an arrangement of the pump system downstream of the first plunger system, can have in each case one suction line with a check valve in each brake circuit, which suction line can additionally connect the pump system hydraulically to the fluid vessel. The additional suction path for the pump system can be used instead of the plunger system, in order to suck in brake fluid from the fluid vessel. This does not result in any problems during the intake operation, even at low temperatures.

In one advantageous refinement of the operating method, in normal operation, the shut-off valves can be transferred into the normally open state for the pressure increase or for the pressure reduction in the brake circuits, and the drive of the plunger system can be actuated, in order to move the pistons in a first direction in order to increase the pressure in the brake circuits, or to move them in a second direction which is opposed to the first direction in order to reduce the pressure in the brake circuits. In order to hold the pressure in the brake circuits, the shut-off valves can be transferred into the normally open state, and the drive of the plunger system can hold the pistons in their current position.

In a further advantageous refinement of the operating method, in normal operation, the associated inlet valve can be opened and the associated outlet valve can be closed for the individual pressure increase in an associated wheel brake. The associated inlet valve and the associated outlet valve can be closed in order to hold the pressure individually in an associated wheel brake. The associated inlet valve can be closed and the associated outlet valve can be opened for the individual pressure reduction in an associated wheel brake.

In a further advantageous refinement of the operating method, in the case of failure of the main system and a second pressure generator which is configured as a second plunger system, the shut-off valves can be transferred into the normally open state, for the pressure increase or for the pressure reduction in the brake circuits, and the drive of the second plunger system can be actuated, in order to move the pistons in a first direction in order to increase the pressure in the brake circuits or to move them in a second direction which is opposed to the first direction in order to reduce the pressure in the brake circuits. The shut-off valves can be transferred into the normally open state and the drive of the second plunger system can hold the pistons in their current position in order to hold the pressure in the brake circuits.

In a further advantageous refinement of the operating method, in the case of failure of the main system and a second pressure generator which is configured as a pump system, the shut-off valves can be transferred into the normally open state, for the pressure increase in the brake circuits, and the pressure holding and pressure regulating valves can be closed and the drive of the second pressure generator can be actuated, in order to increase the pressure by means of the pumps. The shut-off valves can be transferred into the normally open state and the pressure holding and pressure regulating valves can be closed in order to hold the pressure in the brake circuits. The shut-off valves can be transferred into the normally open state and the pressure holding and pressure regulating valves can be opened in order to reduce the pressure in the brake circuits.

In a further advantageous refinement of the operating method, in the case of a detected leak in a brake circuit, the associated shut-off valve can be closed.

Exemplary embodiments of the disclosure are shown in the drawing and will be described in greater detail in the following description. In the drawing, identical designations denote components or elements which carry out identical or analogous functions.

DETAILED DESCRIPTION

Figure 1:
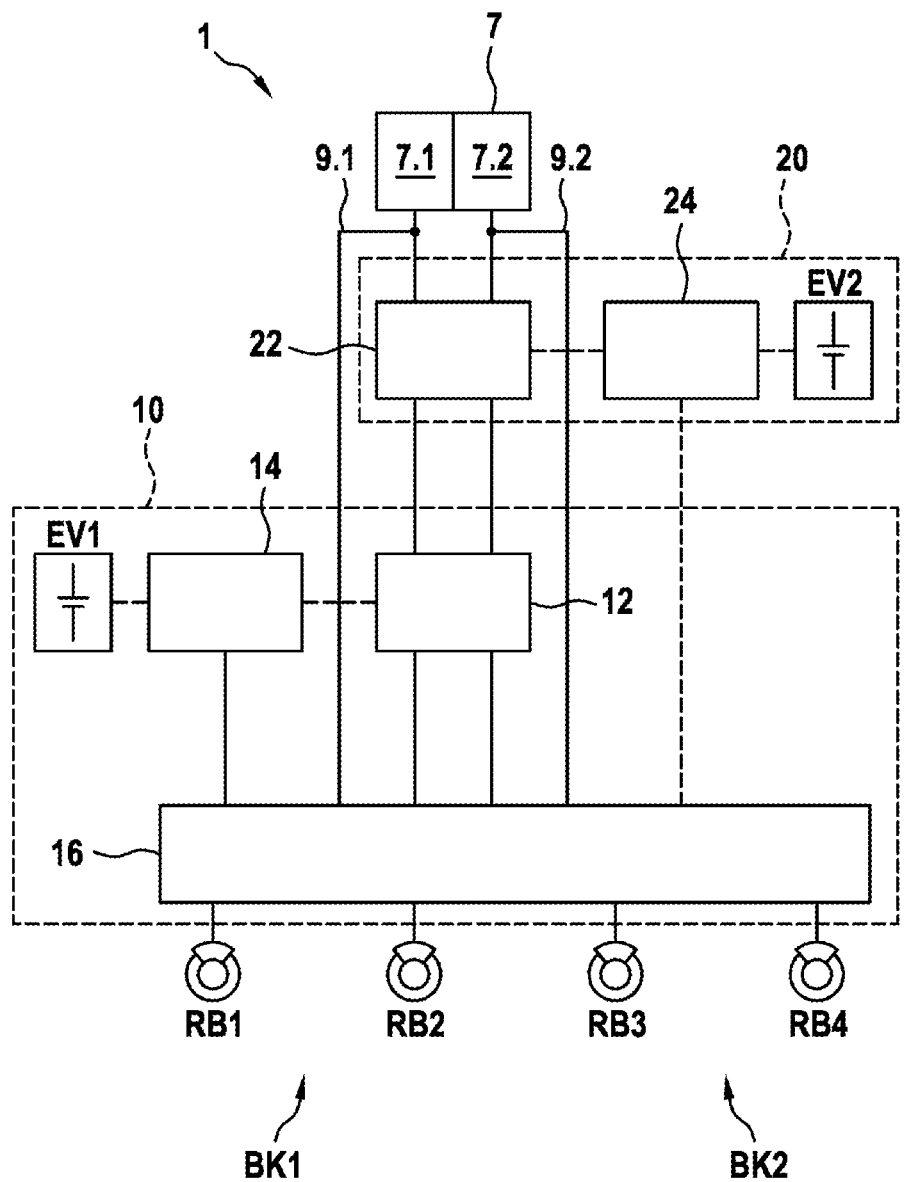
FIG. 1 shows a diagrammatic block diagram of one exemplary embodiment of a multi-circuit hydraulically open brake system according to the disclosure, in particular for a highly automated or autonomous vehicle.

As can be seen from FIGS. 1 to 6, the exemplary embodiments which are shown of a multi-circuit hydraulically open brake system 1, 1A, 1B, 1C, 1D according to the disclosure, in particular for a highly automated or autonomous vehicle, comprise in each case at least two wheel brakes RB1, RB2, RB3, RB4 which are assigned to in each case one brake circuit BK1, BK2 with a pressure discharge path 9.1, 9.2, two multi-circuit pressure generators 12, 22 which are connected hydraulically in series between a fluid vessel 7 and the at least two wheel brakes RB1, RB2, RB3, RB4, and a hydraulic unit 16 for the hydraulic connection of the pressure generators 12, 22 to the at least two wheel brakes RB1, RB2, RB3, RB4 and for the individual brake pressure modulation in the at least two wheel brakes RB1, RB2, RB3, RB4. As can be seen from FIGS. 3 to 6, furthermore, a first pressure generator 12 is configured as a plunger system 12A and is assigned to a main system 10 which comprises a first energy supply EV1 and a first evaluation and control unit 14, as can be seen from FIG. 1, furthermore. As can be seen from FIGS. 3 to 6, furthermore, a second pressure generator 22 is configured as a second plunger system 22A or as a pump system 22B and is assigned to a secondary system 20, 20A, 20B which comprises a second energy supply EV2, which is independent of the first energy supply EV1, and a second evaluation and control unit 24 which actuates the second pressure generator 22. Components of the hydraulic unit 16 for the individual brake pressure modulation are assigned to the main system 10, with the result that said components of the hydraulic unit 16 and the first pressure generator 12 are actuated by the first evaluation and control unit 14 and are supplied with energy by the first energy supply EV1.

As can be seen from FIGS. 1 to 6, furthermore, the brake systems 1, 1A, 1B, 1C, 1D which are shown comprise in each case two brake circuits BK1, BK2 with in each case one pressure discharge path 9.1, 9.2, and four wheel brakes RB1, RB2, RB3, RB4, a first wheel brake RB1 and a second wheel brake RB2 and a first pressure discharge path 9.1 being assigned to a first brake circuit BK1, and a third wheel brake RB3 and a fourth wheel brake RB4 and a second pressure discharge path 9.2 being assigned to a second brake circuit. Here, an X-split of the wheel brakes RB1, RB2, RB3, RB4 to the two brake circuits BK1, BK2 is possible, that is to say the first wheel brake RB1 is arranged at the left-hand front wheel and the second wheel brake RB2 is arranged at the right-hand rear wheel, and the third wheel brake RB2 is arranged at the right-hand front wheel and the fourth wheel brake RB4 is arranged at the left-hand rear wheel. As an alternative, an II-split of the wheel brakes RB1, RB2, RB3, RB4 to the two brake circuits BK1, BK2 is also possible, that is to say the first wheel brake RB1 is arranged at the left-hand front wheel and the second wheel brake RB2 is arranged at the left-hand rear wheel, and the third wheel brake RB2 is arranged at the right-hand front wheel and the fourth wheel brake RB4 is arranged at the right-hand rear wheel.

As can be seen from FIGS. 1 to 6, furthermore, the fluid vessel 7 in the exemplary embodiments of the brake system 1, 1A, 1B, 1C, 1D which are shown comprises in each case one first fluid chamber 7.1 for the fluid supply of the first brake circuit BK1 and a second fluid chamber 7.2 for the fluid supply of the second brake circuit BK2.

As can be seen from FIGS. 3 to 6, furthermore, the first plunger system 12A in the exemplary embodiments of the brake system 1, 1A, 1B, 1C, 1D which are shown has in each case a piston/cylinder unit with two pistons and two chambers 12.1, 12.2 and with a drive 12.3 which is configured as an electric motor and moves the two pistons counter to the force of corresponding restoring springs for setting the pressure in the chambers 12.1, 12.2. Here, a first chamber 12.1 is assigned to the first brake circuit BK1, and a second chamber 12.2 is assigned to the second brake circuit BK2. In addition, the piston/cylinder unit is configured such that flow can pass through it in the currentless state of the first pressure generator 12, with the result that brake fluid can flow through the two chambers 12.1, 12.2.

Figure 2:
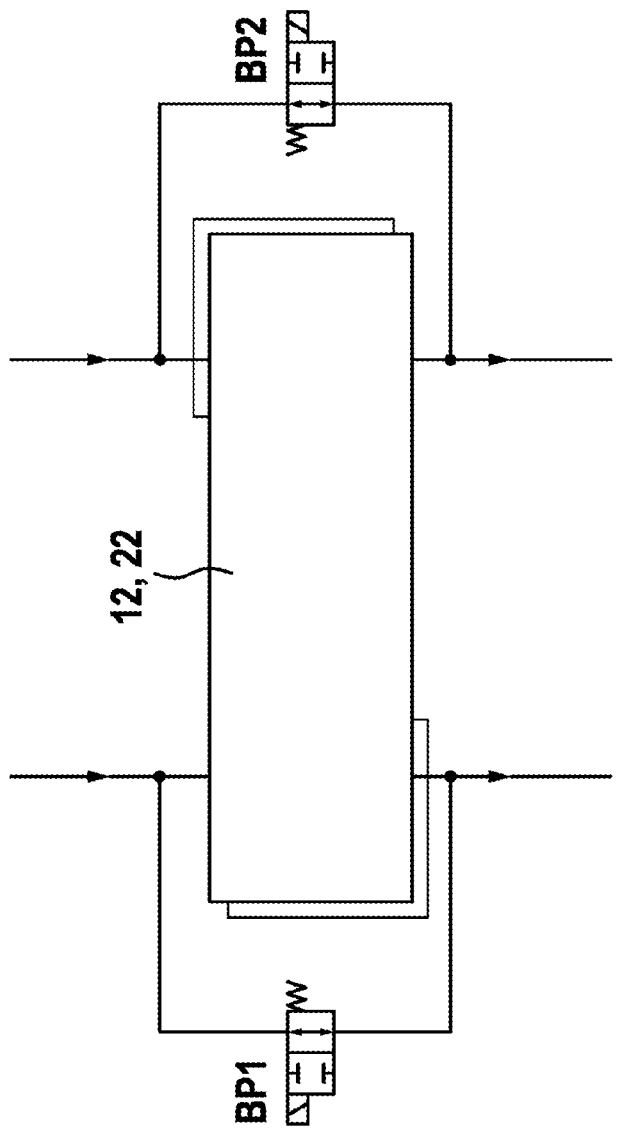
FIG. 2 shows a diagrammatic block diagram of one exemplary embodiment of a hydraulic bypass of a pressure generator of the brake system according to the disclosure from FIG. 1.

As can be seen from FIG. 2, furthermore, a hydraulic bypass or a hydraulic bypassing means can be configured in the brake circuits BK1, BK2 in each case parallel to the first pressure generator 12 and/or to the second pressure generator 22. In the exemplary embodiment which is shown, in each case one first switching valve BP1 shuts off or releases the hydraulic bypass in a first brake circuit BK1 around the first pressure generator 12 and/or around the second pressure generator 22. In each case one second switching valve BP2 shuts off or releases the hydraulic bypass in a second brake circuit BK2 around the first pressure generator 12 and/or around the second pressure generator 22.

Figure 3:
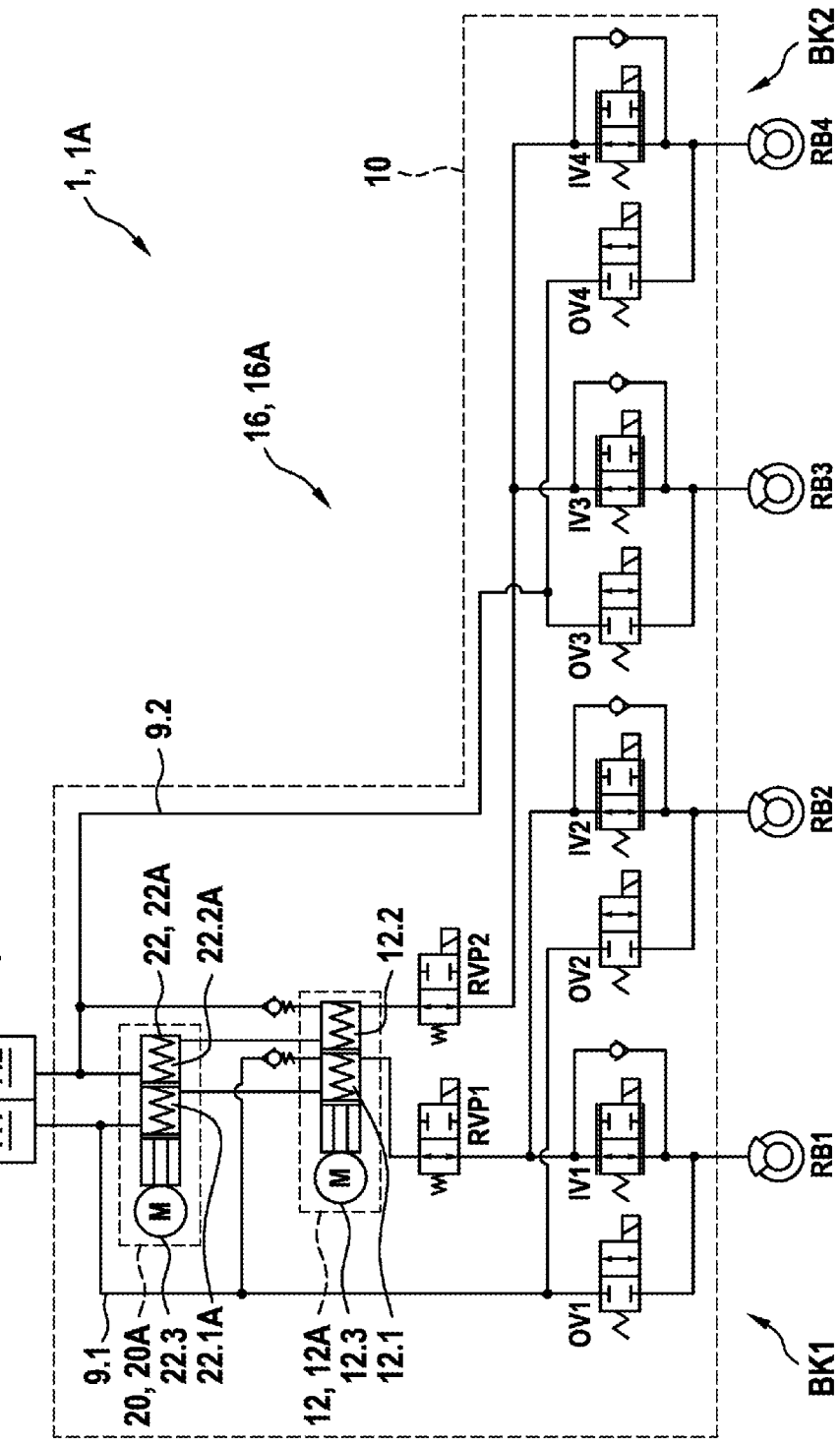
FIG. 3 shows a diagrammatic hydraulic circuit diagram of a first exemplary embodiment of a multi-circuit hydraulically open brake system according to the disclosure, in particular for a highly automated or autonomous vehicle.
Figure 4:
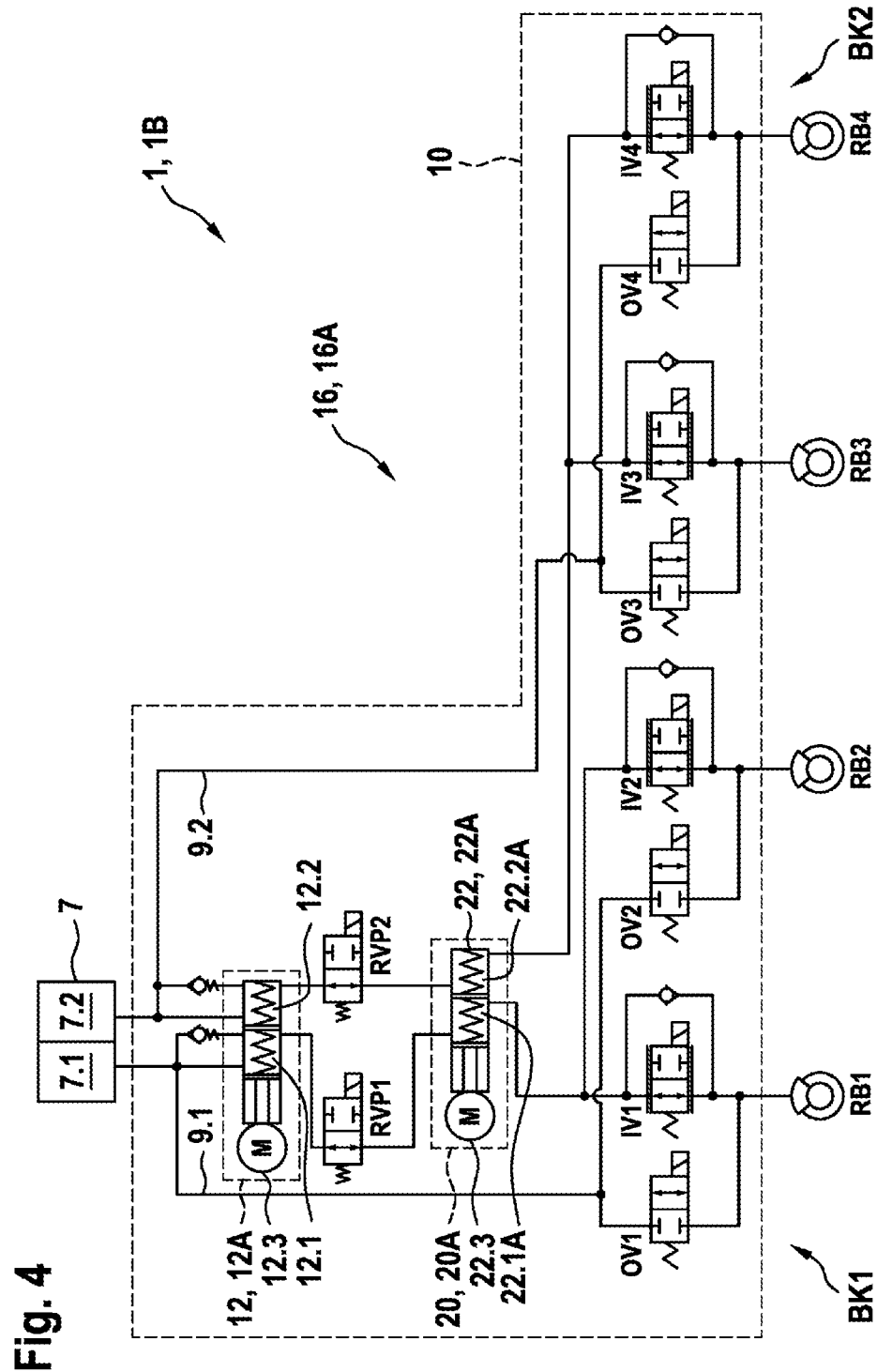
FIG. 4 shows a diagrammatic hydraulic circuit diagram of a second exemplary embodiment of a multi-circuit hydraulically open brake system according to the disclosure, in particular for a highly automated or autonomous vehicle.

As can be seen from FIGS. 3 and 4, furthermore, the second pressure generator 22 is configured as a plunger system 22A in the exemplary embodiments of the brake system 1A, 1B which are shown. In the exemplary embodiments which are shown, in an analogous manner with respect to the first plunger system 12A, the second plunger system 22A has a piston/cylinder unit with two pistons, and two chambers 22.1A, 22.2A and a drive 22.3 which moves the two pistons counter to the force of corresponding restoring springs in order to set the pressure in the chambers 22.1A, 22.2A. In addition, a first chamber 22.1A is assigned to the first brake circuit BK1, and a second chamber 22.2A is assigned to the second brake circuit BK2. Flow can pass through the piston/cylinder units of the second plunger system 22A in the currentless state.

Figure 5:
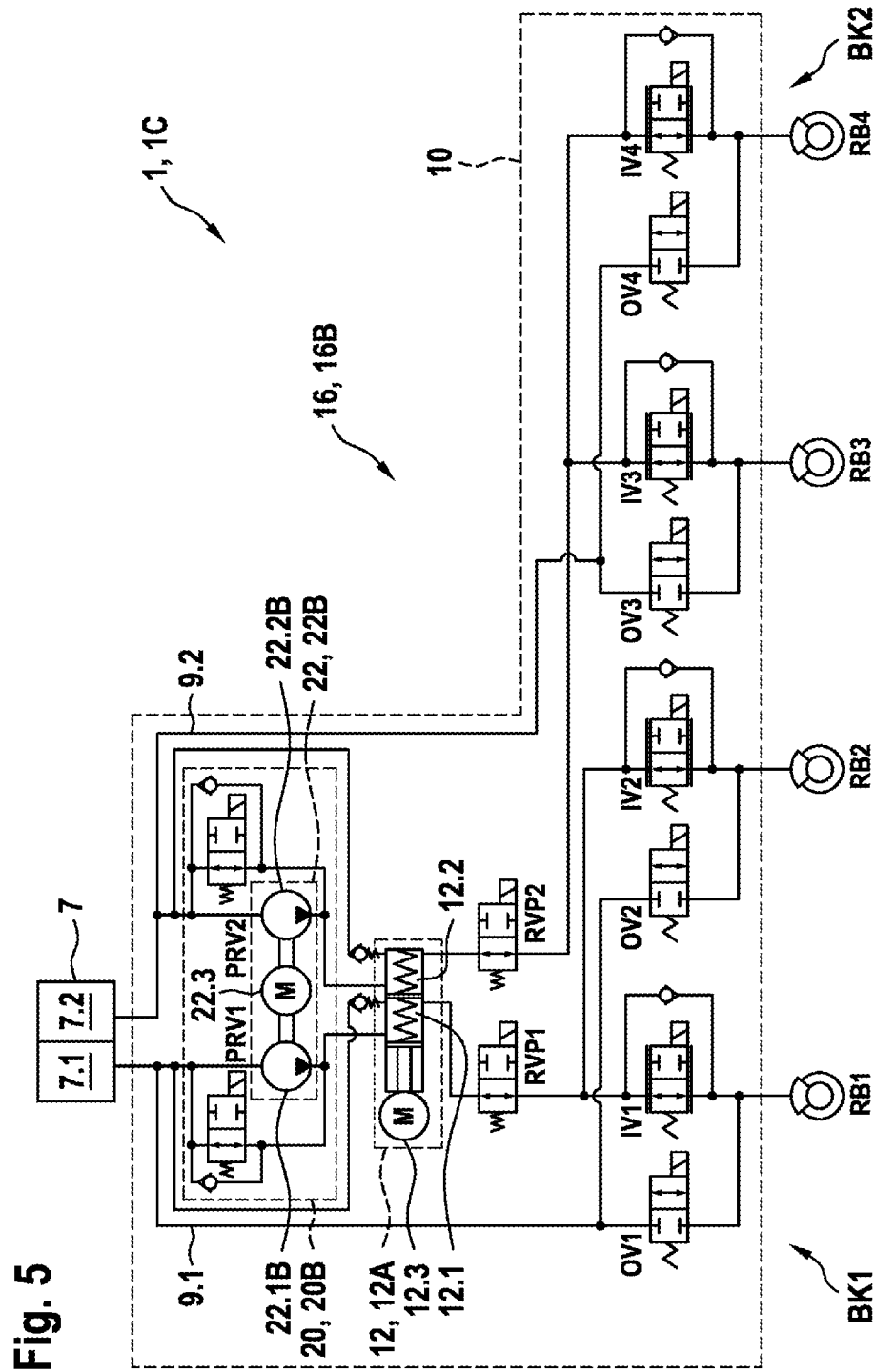
FIG. 5 shows a diagrammatic hydraulic circuit diagram of a third exemplary embodiment of a multi-circuit hydraulically open brake system according to the disclosure, in particular for a highly automated or autonomous vehicle.
Figure 6:
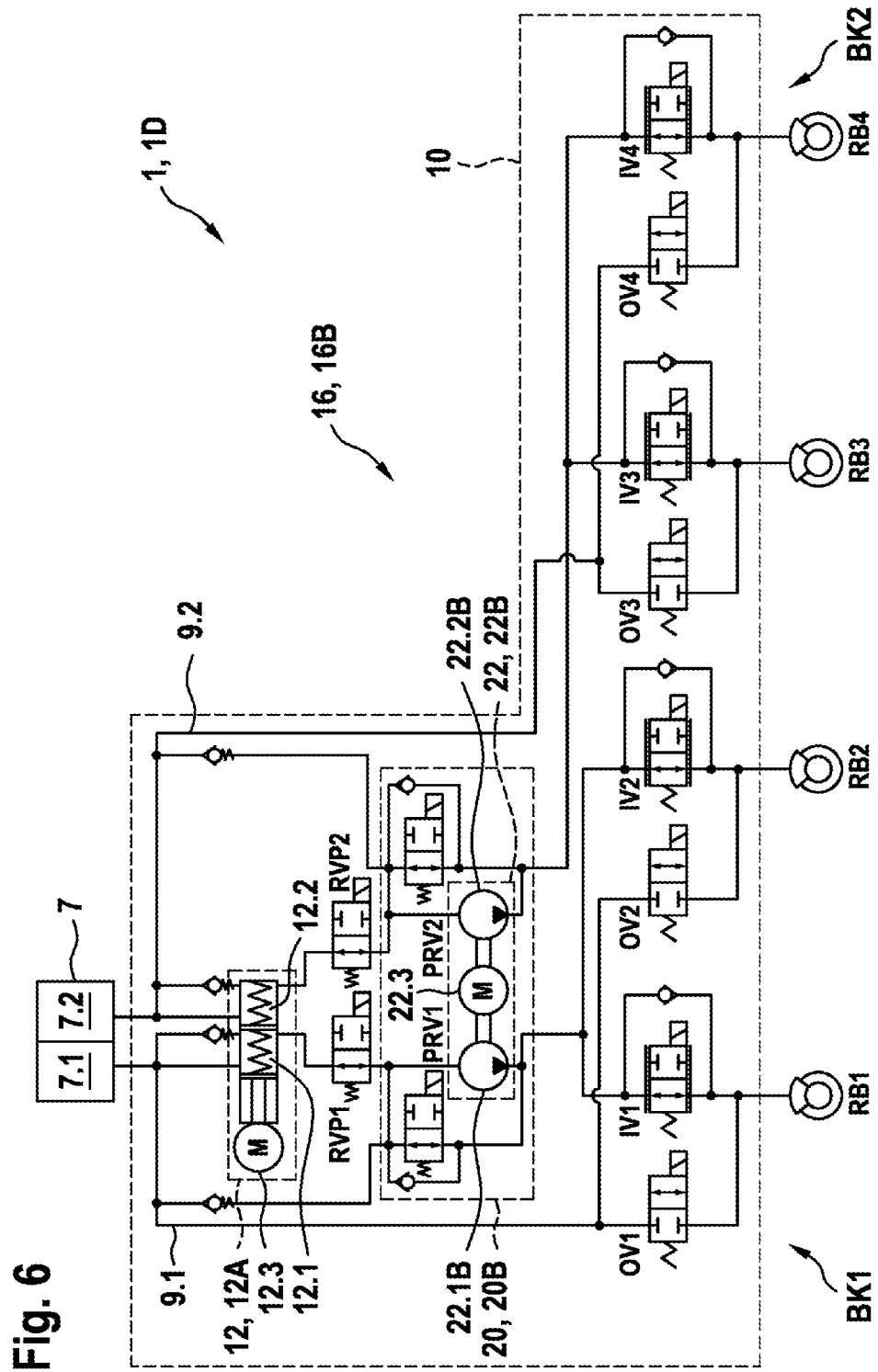
FIG. 6 shows a diagrammatic hydraulic circuit diagram of a fourth exemplary embodiment of a multi-circuit hydraulically open brake system according to the disclosure, in particular for a highly automated or autonomous vehicle.

As can be seen from FIGS. 5 and 6, furthermore, the second pressure generator 22 is configured as a pump system 22B in the exemplary embodiments of the brake system 1C, 1D which are shown. The pump system comprises a first pump 22.1B which is assigned to the first brake circuit BK1, a second pump 22.2B which is assigned to the second brake circuit BK2, and a common drive 22.3 which drives the two pumps 22.1B, 22.2B.

As can be seen from FIGS. 3 and 5, furthermore, first of all the second pressure generator 22 and then the first pressure generator 12 are arranged downstream of the fluid vessel 7 in the exemplary embodiments of the brake system 1A, 1C which are shown.

As can be seen from FIGS. 4 and 6, furthermore, first of all the first pressure generator 12 and then the second pressure generator 22 are arranged downstream of the fluid vessel 7 in the exemplary embodiments of the brake system 1B, 1D which are shown.

As can be seen from FIGS. 3 to 6, furthermore, the hydraulic unit 16 in the exemplary embodiments of the brake system 1, 1A, 1B, 1C, 1D which are shown comprises in each case one inlet valve IV1, IV2, IV3, IV4 and in each case one outlet valve OV1, OV2, OV3, OV4 for each wheel brake RB1, RB2, RB3, RB4, a first inlet valve IV1 and a first outlet valve OV1 being assigned to the first wheel brake RB1. A second inlet valve IV2 and a second outlet valve OV2 are assigned to the second wheel brake RB2. A third inlet valve IV3 and a third outlet valve OV3 are assigned to the third wheel brake RB3, and a fourth inlet valve IV4 and a fourth outlet valve OV4 are assigned to the fourth wheel brake RB4. In addition, for the first pressure generator 12 which is configured as a plunger system 12A, the hydraulic unit 16 comprises, in each brake circuit BK1, BK2, in each case one shut-off valve RVP1, RVP2 and one additional suction line with a check valve, which additionally connect the chambers 12.1, 12.2 of the first plunger system 12A hydraulically to the fluid vessel 7. Here, a first shut-off valve RVP1 is assigned to the first brake circuit BK1, and a second shut-off valve RVP2 is assigned to the second brake circuit BK2. The shut-off valves RVP1, RVP2 make replenishing of brake fluid from the fluid vessel 7 possible. For this purpose, the shut-off valves are opened, and the connection of the first plunger system 12A to the wheel brakes RB1, RB2, RB3, RB4 is interrupted. The chambers 12.1, 12.2 of the first plunger system 12A can then be replenished with brake fluid from the fluid chambers 7.1, 7.2 of the fluid vessel 7. As can be seen from FIGS. 3 and 5, furthermore, the replenishing takes place in the case of the exemplary embodiments which are shown by way of the second pressure generator 20 and via the additional suction lines. As can be seen from FIGS. 4 and 6, furthermore, the replenishing takes place in the case of the exemplary embodiments which are shown directly from the fluid vessel 7 and via the additional suction lines.

As can be seen from FIGS. 5 and 6, furthermore, the hydraulic unit 16 in the exemplary embodiments of the brake system 1C, 1D which are shown has in each case one pressure holding and pressure regulating valve PRV1, PRV2 for the pump system 22B in each brake circuit BK1, BK2, which pressure holding and pressure regulating valves PRV1, PRV2 are assigned to the secondary system 20B and are actuated by the second evaluation and control unit 24 and are supplied with energy by the second energy supply EV2. Here, a first pressure holding and pressure regulating valve PRV1 is assigned to the first brake circuit BK1, and a second pressure holding and pressure regulating valve PRV2 is assigned to the second brake circuit BK2.

As can be seen from FIG. 6, furthermore, the hydraulic unit 16 in the exemplary embodiment which is shown of the brake system 1D has in each case one suction line with a check valve for the pump system 22B in each brake circuit BK1, BK2, which suction line additionally connects the pump system 22B hydraulically to the fluid vessel 7.

As can be seen from FIGS. 3 to 6, furthermore, the inlet valves IV1, IV2, IV3, IV4 and the pressure holding and pressure regulating valves PRV1, PRV2 are configured in the exemplary embodiments of the brake system 1A, 1B, 1C, 1D which are shown in each case as controllable normally open solenoid valves. The outlet valves OV1, OV2, OV3, OV4 and the shut-off valves RVP1, RVP2 are configured in the exemplary embodiments which are shown as electromagnetic normally closed switching valves.

Since the brake system 1, 1A, 1B, 1C, 1D according to the disclosure is configured as a hydraulically open system, brake fluid which is discharged via an associated outlet valve OV1, OV2, OV3, OV4 during an individual brake pressure modulation in a wheel brake RB1, RB2, RB3, RB4 from the wheel brakes RB1, RB2, RB3, RB4 is returned in the exemplary embodiments which are shown via the pressure discharge paths 9.1, 9.2 into the fluid vessel 7. In the exemplary embodiments of the brake system 1A, 1B, 1C, 1D which are shown, the brake fluid which is discharged in each case from the wheel brakes RB1, RB2 of the first brake circuit BK1 via the outlet valves OV1, OV2 is returned via the first pressure discharge path 9.1 to the first fluid chamber 7.1 of the fluid vessel 7. The brake fluid which is discharged from the wheel brakes RB3, RB4 of the second brake circuit BK2 via the outlet valves OV3, OV4 is returned via the second pressure discharge path 9.2 to the second fluid chamber 7.2 of the fluid vessel 7.

In the case of the operating method according to the disclosure for the above-described multi-circuit hydraulically open brake system 1, 1A, 1B, 1C, 1D, in particular for a highly automated or autonomous vehicle, the main system 10 increases or reduces or holds the pressure in the brake circuits BK1, BK2 by means of the first pressure generator 12 in normal operation, and carries out the individual brake pressure modulation in the at least two wheel brakes RB1, RB2, RB3, RB4 by means of the hydraulic unit 16. In the case of failure of the main system 10, the secondary system 20, 20A, 20B increases or reduces or holds the pressure in the brake circuits BK1, BK2 by means of the second pressure generator 22, and the individual brake pressure modulation in the at least two wheel brakes RB1, RB2, RB3, RB4 is dispensed with.

In normal operation, the shut-off valves RVP1, RVP2 are transferred into the normally open state in order to increase the pressure or to reduce the pressure in the brake circuits BK1, BK2, and the drive 12.3 of the first plunger system 12A is actuated, in order to move the pistons in a first direction in order to increase the pressure in the brake circuits BK1, BK2, or to move them in a second direction which is opposed to the first direction in order to reduce the pressure in the brake circuits BK1, BK2. The shut-off valves RVP1, RVP2 are transferred into the normally open state in order to hold the pressure in the brake circuits BK1, BK2, and the drive 12.3 of the first plunger system 12A holds the pistons in their current position.

Furthermore, in normal operation, the associated inlet valve IV1, IV2, IV3, IV4 is opened and the associated outlet valve OV1, OV2, OV3, OV4 is closed for the individual pressure increase in an associated wheel brake RB1, RB2, RB3, RB4. The associated inlet valve IV1, IV2, IV3, IV4 and the associated outlet valve OV1, OV2, OV3, OV4 are closed in order to hold the pressure individually in an associated wheel brake RB1, RB2, RB3, RB4. The associated inlet valve IV1, IV2, IV3, IV4 is closed and the associated outlet valve OV1, OV2, OV3, OV4 is opened for the individual pressure reduction in an associated wheel brake RB1, RB2, RB3, RB4.

In the case of failure of the main system 10 and a second pressure generator 22 which is configured as a second plunger system 22A, the shut-off valves RVP1, RVP2 are transferred into the normally open state for the pressure increase or for the pressure reduction in the brake circuits BK1, BK2, and the drive 22.3 of the second plunger system 12A is actuated, in order to move the pistons in a first direction in order to increase the pressure in the brake circuits BK1, BK2, or to move them in a second direction which is opposed to the first direction in order to reduce the pressure in the brake circuits BK1, BK2. In order to hold the pressure in the brake circuits BK1, BK2, the shut-off valves RVP1, RVP2 are transferred into the normally open state, and the drive 22.3 of the second plunger system 22A holds the pistons in their current position.

In the case of failure of the main system 10 and a second pressure generator 22 which is configured as a pump system 22B, in order to increase the pressure in the brake circuits BK1, BK2, the shut-off valves RVP1, RVP2 are transferred into the normally open state, and the pressure holding and pressure regulating valves PRV1, PRV2 are closed and the drive 22.3 of the second pressure generator 22 is actuated, in order to increase the pressure by means of the pumps 22.1, 22.2. In order to hold the pressure in the brake circuits BK1, BK2, the shut-off valves RVP1, RVP2 are transferred into the normally open state and the pressure holding and pressure regulating valves PRV1, PRV2 are closed. For the pressure reduction in the brake circuits BK1, BK2, the shut-off valves RVP1, RVP2 are transferred into the normally open state and the pressure holding and pressure regulating valves PRV1, PRV2 are opened.

Moreover, in the case of a detected leak in a brake circuit BK1, BK2, the associated shut-off valve RVP1, RVP2 is closed.

Said method can be implemented, for example, in software or hardware or in a mixed form comprising software and hardware, for example in a control unit.

Embodiments of the present disclosure provide a multi-circuit hydraulically open brake system without mechanical and/or hydraulic intervention by way of the driver, in particular for a highly automated or autonomous vehicle, and a corresponding operating method, the pressure generators which are used and are arranged in series hydraulically acting on all wheel brakes of the vehicle via the hydraulic unit by way of the hydraulic connection.

The invention claimed is:

1. A multi-circuit hydraulically open brake system, comprising:
    at least two wheel brakes which are assigned to in each case one brake circuit of at least two brake circuits with a pressure discharge path;
    a first multi-circuit pressure generator and a second multi-circuit pressure generator which are connected hydraulically in series between a fluid vessel and the at least two wheel brakes; and
    a hydraulic unit configured (i) to connect hydraulically the first and the second pressure generators to the at least two wheel brakes, and (ii) to modulate individual brake pressure in the at least two wheel brakes,
    wherein the first pressure generator is configured as a first plunger system and is assigned to a main system which comprises a first energy supply and a first evaluation and control unit,
    wherein the second pressure generator is configured as a second plunger system or as a pump system and is assigned to a secondary system which comprises a second energy supply, which is independent of the first energy supply, and a second evaluation and control unit configured to actuate the second pressure generator, and
    wherein components of the hydraulic unit are assigned to the main system for the individual brake pressure modulation, such that said components of the hydraulic unit and the first pressure generator are actuated by the first evaluation and control unit and are supplied with energy by the first energy supply,
    wherein, in normal operation, the first evaluation and control unit is configured to operate the first pressure generator to increase, reduce, or hold pressure in the at least two brake circuits and to carry out individual brake pressure modulation in the at least two wheel brakes, and
    wherein in a case of failure of the main system, the second evaluation and control unit is configured to operate the second pressure generator to increase, reduce, or hold the pressure in the at least two brake circuits, and to dispense with the individual brake pressure modulation in the at least two wheel brakes.

2. The brake system as claimed in claim 1, wherein first of all the first pressure generator and then the second pressure generator are arranged downstream of the fluid vessel.

3. The brake system as claimed in claim 1, wherein first of all the second pressure generator and then the first pressure generator are arranged downstream of the fluid vessel.

4. The brake system as claimed in claim 1, further comprising:

a hydraulic bypass configured in the at least two brake circuits in each case parallel to the first pressure generator and/or to the second pressure generator.

5. The brake system as claimed in claim 4, wherein:
in each case one first switching valve shuts off or releases the hydraulic bypass in a first brake circuit of the at least two brake circuits around the first pressure generator and/or around the second pressure generator, and
in each case one second switching valve shuts off or releases the hydraulic bypass in a second brake circuit of the at least two brake circuits around the first pressure generator and/or around the second pressure generator.

6. The brake system as claimed in claim 5, wherein the fluid vessel comprises a first fluid chamber configured to supply fluid to the first brake circuit and a second fluid chamber configured to supply fluid to the second brake circuit.

7. The brake system as claimed in claim 1, wherein:
the first plunger system and the second plunger system in each case have a piston/cylinder unit with two pistons and two chambers and with a drive,
the respective drive in each case moving the two pistons of the corresponding plunger system counter to a force of corresponding restoring springs for setting a pressure in the two chambers,
in each case one first chamber of the two chambers is assigned to a first brake circuit of the at least two brake circuits and in each case one second chamber of the two chambers is assigned to a second brake circuit of the at least two brake circuits, and
flow passing through the piston/cylinder units of the plunger systems in a currentless state.

8. The brake system as claimed in claim 1, wherein the second pressure generator is configured as the pump system, and the pump system has a first pump assigned to a first brake circuit of the at least two brake circuits, a second pump which is assigned to a second brake circuit of the at least two brake circuits, and a common drive which drives the first and the second pumps.

9. The brake system as claimed in claim 8, wherein the hydraulic unit has in each case one pressure holding and pressure regulating valve for the pump system in each brake circuit of the at least two brake circuits, which pressure holding and pressure regulating valves are assigned to the secondary system, are actuated by the second evaluation and control unit, and are supplied with energy by the second energy supply.

10. The brake system as claimed in claim 9, wherein the hydraulic unit has in each case one suction line with a check valve for the pump system in each brake circuit of the at least two brake circuits, which suction line additionally connects the pump system in each brake circuit of the at least two brake circuits hydraulically to the fluid vessel.

11. The brake system as claimed in claim 1, wherein, for each wheel brake of the at least two wheel brakes, the hydraulic unit comprises in each case one inlet valve and in each case one outlet valve for the individual brake pressure modulation.

12. The brake system as claimed in claim 1, wherein:
the hydraulic unit has in each case one shut-off valve for the first plunger system in each brake circuit of the at least two brake circuits, and
the shut-off valve, in each case, is configured to replenish brake fluid from the fluid vessel.

13. A multi-circuit hydraulically open brake system, comprising:
at least two wheel brakes which are assigned to in each case one brake circuit of at least two brake circuits with a pressure discharge path;
a first multi-circuit pressure generator and a second multi-circuit pressure generator which are connected hydraulically in series between a fluid vessel and the at least two wheel brakes; and
a hydraulic unit configured (i) to connect hydraulically the first and the second pressure generators to the at least two wheel brakes, and (ii) to modulate individual brake pressure in the at least two wheel brakes, wherein:
the first pressure generator is configured as a first plunger system and is assigned to a main system which comprises a first energy supply and a first evaluation and control unit,
the second pressure generator is configured as a second plunger system or as a pump system and is assigned to a secondary system which comprises a second energy supply, which is independent of the first energy supply, and a second evaluation and control unit configured to actuate the second pressure generator, and
wherein components of the hydraulic unit are assigned to the main system for the individual brake pressure modulation, such that said components of the hydraulic unit and the first pressure generator are actuated by the first evaluation and control unit and are supplied with energy by the first energy supply,
the hydraulic unit has in each case one suction line with a check valve for the first plunger system in each brake circuit of the at least two brake circuits, and
the suction line is configured to additionally connect the first plunger system hydraulically to the fluid vessel.

14. An operating method for a multi-circuit hydraulically open brake system, comprising:
increasing, reducing, or holding pressure in corresponding brake circuits with a first multi-circuit pressure generator of a main system in normal operation and carrying out individual brake pressure modulation in at least two wheel brakes with a hydraulic unit, the at least two wheel brakes each operably connected to one of the corresponding brake circuits; and
in a case of failure of the main system, increasing, reducing, or holding the pressure in the corresponding brake circuits with a second multi-circuit pressure generator of a secondary system, and dispensing with the individual brake pressure modulation in the at least two wheel brakes,
wherein each corresponding brake circuit includes a pressure discharge path,
wherein the first multi-circuit pressure generator and the second multi-circuit pressure generator are connected hydraulically in series between a fluid vessel and the at least two wheel brakes,
wherein the hydraulic unit is configured to connect hydraulically the first and the second pressure generators to the at least two wheel brakes,
wherein the first pressure generator is configured as a first plunger system and is assigned to the main system which comprises a first energy supply and a first evaluation and control unit,
wherein the second pressure generator is configured as a second plunger system or as a pump system and is assigned to the secondary system which comprises a second energy supply, which is independent of the first energy supply, and a second evaluation and control unit configured to actuate the second pressure generator, and wherein components of the hydraulic unit are assigned to the main system for the individual brake pressure modulation, such that said components of the hydraulic unit and the first pressure generator are actuated by the first evaluation and control unit and are supplied with energy by the first energy supply.

15. The operating method as claimed in claim 14, wherein:
the hydraulic unit has in each case one shut-off valve for the first plunger system in each of the corresponding brake circuits,
the shut-off valve, in each case, is configured to replenish brake fluid from the fluid vessel,
the first plunger system has a piston/cylinder unit with two pistons and two chambers and with a drive, and
the method further comprises in normal operation, transferring the shut-off valves into a normally open state for a pressure increase or for a pressure reduction in the at least two brake circuits, and the drive of the first plunger system is actuated, in order to move the two pistons in a first direction in order to increase the pressure in the corresponding brake circuits, or to move the two pistons in a second direction which is opposed to the first direction in order to reduce the pressure in the corresponding brake circuits, the shut-off valves being transferred into the normally open state in order to hold the pressure in the corresponding brake circuits, and the drive of the first plunger system holding the two pistons in a current position.

16. The operating method as claimed in claim 15, further comprising:
in a case of failure of the main system and the second pressure generator which is configured as the second plunger system, the shut-off valves are transferred into the normally open state, for the pressure increase or for the pressure reduction in the corresponding brake circuits, and a second drive of the second plunger system is actuated, in order to move two second pistons of the second plunger system in a first direction in order to increase the pressure in the corresponding brake circuits or to move the two second pistons in a second direction which is opposed to the first direction in order to reduce the pressure in the corresponding brake circuits, the shut-off valves being transferred into the normally open state and the second drive of the second plunger system holding the two second pistons in a current position in order to hold the pressure in the corresponding brake circuits.

17. The operating method as claimed in claim 15, further comprising:
in the case of failure of the main system and the second pressure generator which is configured as the pump system, the shut-off valves are transferred into the normally open state, for the pressure increase in the corresponding brake circuits, and pressure holding and pressure regulating valves are closed and a second drive of the second pressure generator is actuated, in order to increase the pressure by means of pumps of the pump system, the shut-off valves being transferred into the normally open state and the pressure holding and pressure regulating valves being closed in order to hold the pressure in the corresponding brake circuits, and the shut-off valves being transferred into the normally open state and the pressure holding and pressure regulating valves being opened in order to reduce the pressure in the corresponding brake circuits.

18. The operating method as claimed in claim 15, wherein, in a case of a detected leak in at least one of the corresponding brake circuits, the associated shut-off valve is closed.

19. The operating method as claimed in claim 14, wherein:
for each wheel brake of the at least two wheel brakes, the hydraulic unit comprises in each case one inlet valve and in each case one outlet valve for the individual brake pressure modulation,
the method further comprises, in normal operation, the associated inlet valve is opened and the associated outlet valve is closed for the individual pressure increase in an associated wheel brake, the associated inlet valve and the associated outlet valve being closed in order to hold the pressure individually in an associated wheel brake, and the associated inlet valve being closed and the associated outlet valve being opened for the individual pressure reduction in an associated wheel brake.

20. A multi-circuit hydraulically open brake system, comprising:
at least two wheel brakes which are assigned to in each case one brake circuit of at least two brake circuits with a pressure discharge path;
a first multi-circuit pressure generator and a second multi-circuit pressure generator which are connected hydraulically in series between a fluid vessel and the at least two wheel brakes;
a hydraulic unit configured (i) to connect hydraulically the first and the second pressure generators to the at least two wheel brakes, and (ii) to modulate individual brake pressure in the at least two wheel brakes; and
a hydraulic bypass configured in the at least two brake circuits in each case parallel to the first pressure generator and/or to the second pressure generator,
wherein the first pressure generator is configured as a first plunger system and is assigned to a main system which comprises a first energy supply and a first evaluation and control unit,
wherein the second pressure generator is configured as a second plunger system or as a pump system and is assigned to a secondary system which comprises a second energy supply, which is independent of the first energy supply, and a second evaluation and control unit configured to actuate the second pressure generator, and
wherein components of the hydraulic unit are assigned to the main system for the individual brake pressure modulation, such that said components of the hydraulic unit and the first pressure generator are actuated by the first evaluation and control unit and are supplied with energy by the first energy supply.

* * * * *